United States Patent [19]

Barakaev et al.

[11] 4,015,170
[45] Mar. 29, 1977

[54] METHOD FOR OVERVOLTAGE PROTECTION OF HVDC TRANSMISSION LINE SYSTEMS

[76] Inventors: Khristofor Fedorovich Barakaev, ulitsa Molostovykh, 19, kv. 344; Alexandr Sergeevich Gilim, ulitsa Miklukho-Maklaya, 65, korpus 2, kv. 40; Anatoly Viktorovich Stukachev, Festivalnaya ulitsa, 7, kv. 34, all of Moscow; Robert Nikolaevich Shulga, ulitsa Pobedy, 14a, kv. 41, Reutov Moskovskoi oblasti, all of U.S.S.R.

[22] Filed: June 30, 1975

[21] Appl. No.: 592,071

[52] U.S. Cl. .................................. 361/91; 321/11; 321/14; 361/118
[51] Int. Cl.² ......................................... H02H 7/10
[58] Field of Search ............... 317/33 SC, 31, 27 R; 307/202 R; 321/11–14

[56] References Cited

UNITED STATES PATENTS

| 3,487,261 | 12/1969 | Boksjo et al. ..................... 321/11 X |
| 3,599,075 | 8/1971 | Etter et al. ............................ 321/11 |
| 3,622,862 | 11/1971 | Boksjo ................................. 321/11 |
| 3,662,250 | 5/1972 | Piccone et al. ....................... 321/11 |
| 3,865,438 | 2/1975 | Boksjo et al. ..................... 321/11 X |
| 3,886,432 | 5/1975 | Piccone et al. ....................... 321/11 |

*Primary Examiner*—J D Miller
*Assistant Examiner*—Patrick R. Salce

[57] ABSTRACT

A method for overvoltage protection of HVDC transmission line schemes by means of a surge arrester including a current limiting resistor, whereby a one-time misfire of valves is effected at the instant of actuation of the surge arrester, with a subsequent recovery of normal operation of the converter.

3 Claims, 2 Drawing Figures

METHOD FOR OVERVOLTAGE PROTECTION OF HVDC TRANSMISSION LINE SYSTEMS

The present invention relates to the field of electrical engineering, and more particularly, to methods for overvoltage protection of HVDC transmission line systems.

Known in the art is a method for overvoltage protection of HVDC transmission line systems realized through the use of surge arresters. Compared to conventional arresters employed in alternating current systems, the surge arrester intended for protection of the converter must provide for quenching of arcs of direct follow current. The spark gaps of the surge arrester fail to satisfy this function, hence, it is necessary that after the actuation of the arrester, the follow current be interrupted by operating the converter.

It is likewise known that in response to actuation of the surge arrester, the valve grids stop conducting, or, otherwise, the converter is first transferred to the inverter mode, and then the valve grids are cut off. After that, a shunting valve (or two operating rectifier valves in the same phase), or a shunting circuit is switched on, and interruption of the current through the surge arrester circuit is followed by a conductive state of the rectifier valve grids, whereas the shunting valve or the shunting circuit is switched off. Hence, the prior-art methods of interrupting the current through the arrester circuit require the use of shunting elements and bring about interruptions in power supply to the consumers.

An object of the present invention is to minimize the time of stoppages in power supply resulting from flashover of the surge arresters.

Another object of the invention is to simplify the construction of the converter.

A further object of the invention is to improve reliability in operation of the rectifier valves.

With these and other objects in view, a method for overvoltage protection of direct current transmission line converter by means of a surge arrester including a current limiting resistor inserter in series with the arrester, is herein proposed, whereby, according to the invention, at the instant of actuation of the arrester, a one-time misfire of the rectifier valves is effected, with a subsequent recovery of normal operation of the converter.

It is expedient that said misfire of the rectifier valves be accomplished by cutting off the control pulses for a period of a single switching of the converter.

As a consequence, the time of interruption in power supply to the consumers is reduced and the reliability of the rectifier valves is improved by virtue of obviating the need for transfer thereof to the inverter mode, with the construction of the converter simplified since no shunting valve is required.

The invention will now be described in greater detail with reference to a preferred embodiment thereof taken in conjunction with the accompanying drawings, wherein.

Figure 1:
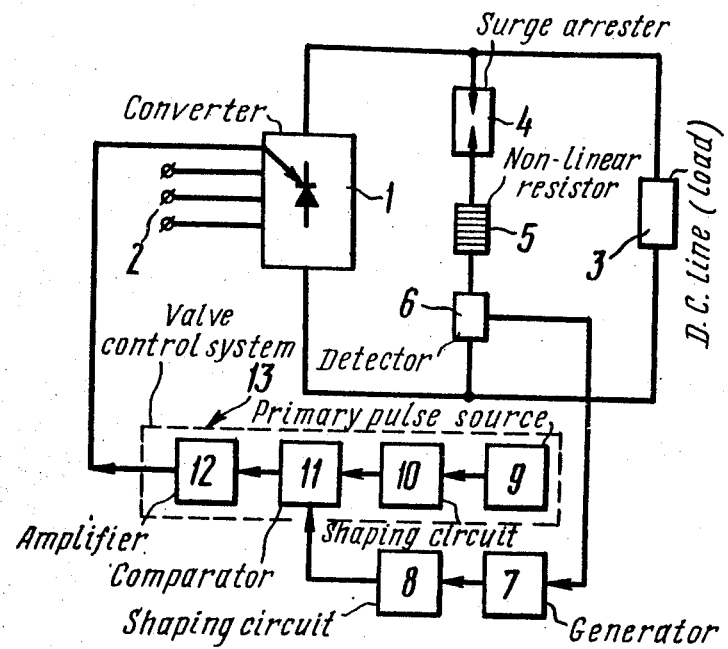
FIG. 1 is a schematic diagram of a HVDC transmission line with the overvoltage protection circuit, according to the invention.

Referring now to FIG. 1, a converter 1 is connected to AC busbars 2, with a direct current line (load) 3 connected across the output of the converter 1.

To protect the converter 1 against overvoltages, a surge arrester 4 is installed, with a nonlinear resistor 5 inserted in series thereto.

The converter 1 may be hooked up as any known circuit, and specifically, as a tandem bridge circuit.

In accordance with the invention, a current detector 6 inserted in series with the surge arrester and intended to respond to actuation of the arrester is essentially a common shunt or electronic circuit.

The output of the detector 6 is applied to the pulse generator 7 which produces a pulse when current flows through the detector 6. The output pulse of the generator 7 is fed to the input of a shaping circuit 8 in the form of a blocking oscillator or a kipp relay, which shapes a wide pulse or a sequence of narrow pulses equal in amplitude and opposite in polarity to the control pulses produced by a primary pulse source 9 and shaping circuit 10. The pulse source 9 and the shaping circuit 10 can be made in any known form, and in particular, as a magnetic or electric shaping circuit. Connected to the input of a comparator 11 included into the rectifier valve control system are the inputs of the shaping circuits 8 and 10. The output of the comparator 11 is applied to the input of an amplifier 12. The units 9, 10 and 12 are incorporated into the known valve control system 13, the outputs thereof being connected to the grids (or control electrodes) of the valves in the converter 1.

The inventive concept can be better understood from the following description.

The detector 6 included in the circuit of the surge arrester 4 responds to the current I (FIG. 2) through the surge arrester 4 during a flashover due to overvoltage, and the signal produced by the detector 6 is supplied through the units 7 and 8 to the comparator 11 which cuts off the pulses derived from the primary pulse source 9 and from the shaping circuit 10 for a time of a single switching. Blocking (misfire) of the control pulses leads to disappearance of the control pulse across one of the valves in the converter 1. As a consequence, the next valve of the converter, according to the alternating sequence, will misfire, and the voltage $U = f(v)$ (FIG. 2) across the poles of the converter unit 1 will drop to zero for a time equal to or somewhat less than that specified above, with the current $I = f(v)$ through the surge arrester interrupted. The pulse for triggering the next valve, according to the alternating sequence, is not cut off, and the valve fires normally, so that the voltage U across the poles of the converter 1 is recovered.

Figure 2:
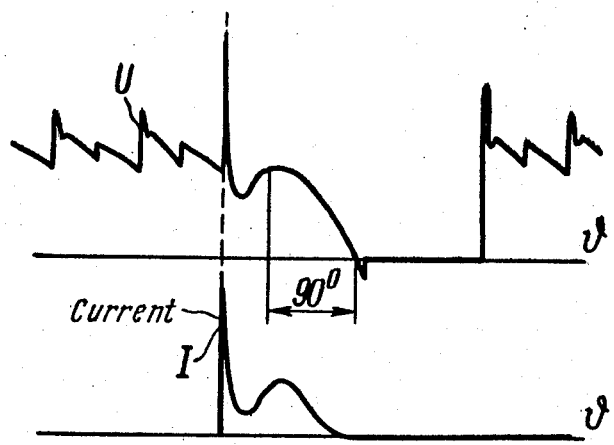
FIG. 2 is a graph showing the surge arrester circuit voltage and current.

From the curve $U = f(v)$ of FIG. 2 it follows that the surge arrester 4 remains in de-energized state until the voltage across the circuit thereof is recovered within an interval of at least 90 electrical degrees.

It has been established by experiments that said interval is quite sufficient to recover the insulation strength of the arrester operating in a direct current transfer line.

The consumer does not perceive a one-time misfire, and no transfer of the converter to the inverter mode is required. Compared to other prior methods, the interruption in power supply to the consumers is reduced from hundreds to 10 milliseconds, and the operation of the rectifier valves is improved because the need for transferring the valves to the inverter mode is eliminated.

What is claimed is:

1. A method for overvoltage protection of an HVDC transmission line system in which AC is supplied to the valves of a converter and a surge arrestor and resistor are connected on the DC side of the converter, said method comprising supplying control pulses to the valves of the converter for operation thereof, detecting the presence of overvoltage in the converter by actuation of the surge arrester, blocking passage of a control pulse to a valve of the converter in response to actuation of the surge arrestor to produce misfire of the valve and zero output of the converter whereby the surge arrestor becomes deactuated and the control pulses are then again supplied to the converter valves and the converter resumes normal operation.

2. A method as claimed in claim 1 wherein the valves of the converter are subjected to one-time misfire upon actuation of the surge arrester.

3. A method as claimed in claim 2 wherein the control pulses are blocked from the converter during a time sufficient for a single switching of said converter.

* * * * *